(12) United States Patent
Cossey

(10) Patent No.: US 6,289,118 B1
(45) Date of Patent: Sep. 11, 2001

(54) METHOD AND APPARATUS FOR CHOOSING A COMPRESSION ALGORITHM

(75) Inventor: George Cossey, San Jose, CA (US)

(73) Assignee: Magnifi, Inc., Cupertino, CA (US)

( * ) Notice: Subject to any disclaimer, the term of this patent is extended or adjusted under 35 U.S.C. 154(b) by 0 days.

(21) Appl. No.: 09/055,116

(22) Filed: Apr. 3, 1998

(51) Int. Cl.[7] .................................................. G06K 9/00
(52) U.S. Cl. ........................................... 382/162; 382/232
(58) Field of Search .................................. 382/166, 232, 382/164, 162, 190, 167, 163, 165; 358/539; 395/109

(56) References Cited

U.S. PATENT DOCUMENTS

| | | | |
|---|---|---|---|
| 4,965,754 | * 10/1990 | Stansfield et al. | 364/526 |
| 5,353,132 | * 10/1994 | Katsuma | 358/539 |
| 5,553,160 | * 9/1996 | Dawson | 382/166 |
| 5,825,917 | * 10/1998 | Suzuki | 382/164 |
| 5,838,821 | * 11/1998 | Matsubara et al. | 382/190 |
| 5,838,823 | * 11/1998 | Ancessi | 382/232 |
| 5,909,505 | * 6/1999 | Katayama et al. | 382/164 |
| 5,915,077 | * 6/1999 | Kulkarni et al. | 395/109 |
| 5,987,165 | * 11/1999 | Matsuzaki et al. | 382/162 |

* cited by examiner

Primary Examiner—Phuoc Tran
Assistant Examiner—Amir Alavi
(74) Attorney, Agent, or Firm—Blakely, Sokoloff, Taylor & Zafman LLP

(57) ABSTRACT

A computer implemented method of selecting a compression algorithm for compressing information. The method comprises a computer implemented process of analyzing the content of information in a data file and selecting a compression method based on the content of the data file.

8 Claims, 5 Drawing Sheets

METHOD AND APPARATUS FOR CHOOSING A COMPRESSION ALGORITHM

BACKGROUND OF THE INVENTION

1. Field of the Invention

The present invention relates to the field of computing and data systems, and specifically to compression of data files.

2. Description of the Related Art

Compression of data in computer systems is well-known. In fact, there are several standards and emerging standards used for data compression.

For example, JPEG (Joint Photographic Experts Group) is a compression methodology defined by the International Standards Organization (ISO) as ISO standard 10918 for compression of still images. JPEG is commonly used for compression of images on the World Wide Web (WWW) and elsewhere on the Internet.

Another compression algorithm commonly used for compression of images on the Internet is GIF (Graphic Interchange Format). GIF is a de facto standard.

JPEG is generally thought to be a better compression algorithm than GIF if an image with lots of colors needs to be compressed. The downside is that the compressed file is relatively large compared to a GIF file for the same original image when the image has a small number of colors. GIF, on the other hand, is generally thought of as a superior compression technology to JPEG for text files in part because of its ability to compress black and white files efficiently.

Other compression methodologies exist for video (e.g., MPEG or Motion Picture Experts Group) and audio.

Typically, applications expect data files of a certain class (e.g., lots of colors, lots of text, etc.) and they are designed by their developers to use a compression methodology which will be relatively efficient for the expected type of data.

Unfortunately, it is not always possible for the application developers to predict in advance the type of data file which will need to be compressed is especially if the application is one which can expect to encounter numerous classes of data files. It would be useful to provide a method for choosing an efficient compression algorithm.

One example of an application in which it is difficult, if not impossible, to predict in advance the type of data file which will need to be compressed in a search and indexing tool which searches for media content files and stores the media content in a compressed form allowing users to preview the content. An example of such a tool is the Magnifi™ Server available from Magnifi, Inc. of Cupertino, Calif. The Magnifi™ Server is capable of indexing vast amounts of information from many sources. The format of the information is typically not predictable in advance. By way of example, however, an image which is optimally compressed with GIF can take 5–10 times more storage area if compressed with JPEG. For an image which is optimally compressed with JPEG, compression with GIF will result in a 2 to 3 times increase in storage area. Clearly, it is desirable, in a tool which indexes large volumes of data to provide for an index which is as small as possible.

When a searchable index includes the storage of visual previews of media objects, it is desirable to minimize the storage space associated with the visual preview files. The visual preview files are typically compressed image files where minimum file size and maximum picture quality are objectives.

SUMMARY OF THE INVENTION

A computer implemented method of selecting a compression algorithm for compressing information is described. In brief summary, the method comprises a computer implemented process of analyzing the content of information in a data file and selecting a compression method based on the content of the data file.

In one embodiment of the invention, the data files are still image files. The still image files are analyzed to determine the number of colors in the file. If the number of colors exceeds a threshold, the file is compressed with one compression algorithm. Otherwise, it is compressed with another compression algorithm.

Alternative embodiments allow for compression of movie files and audio files.

Figure 1:
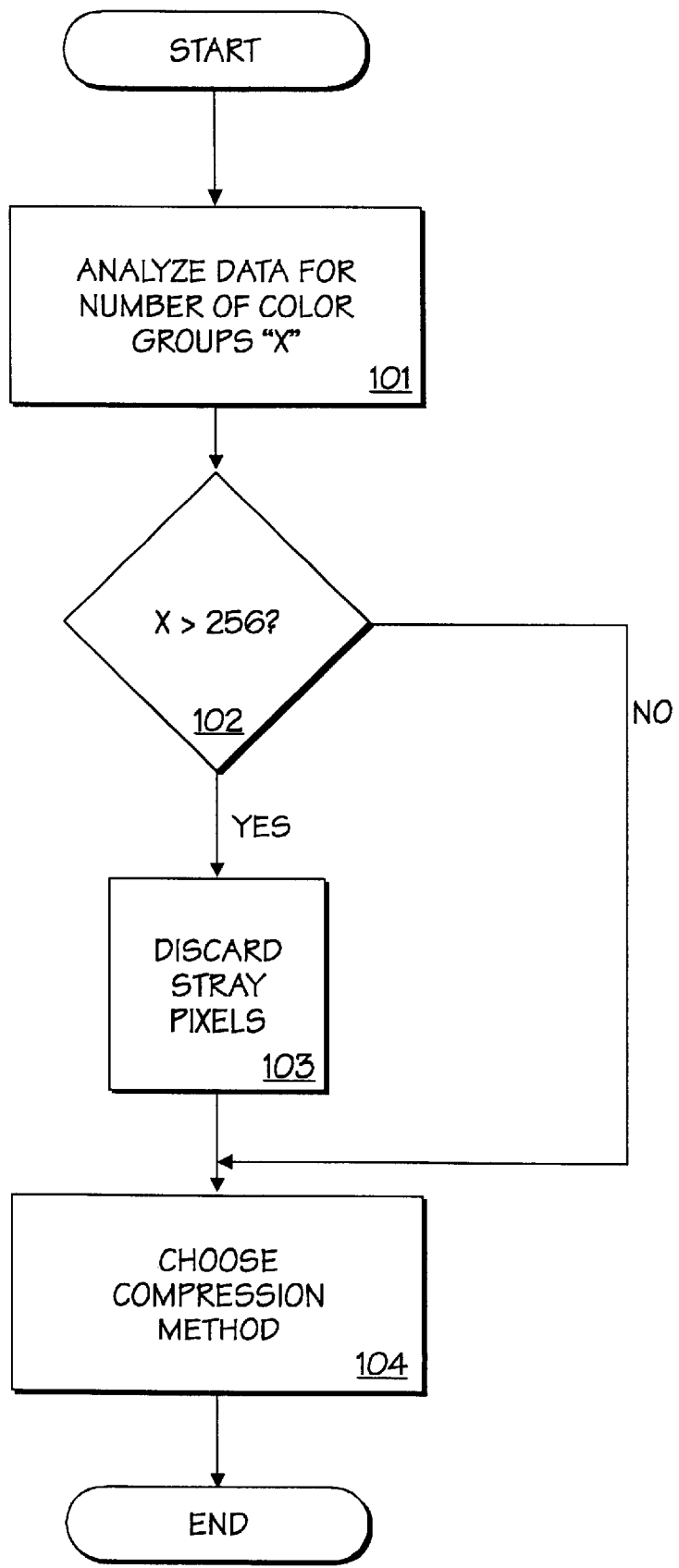
FIG. 1 is a flow diagram illustrating a method as may be implemented by the present invention.
Figure 3A:
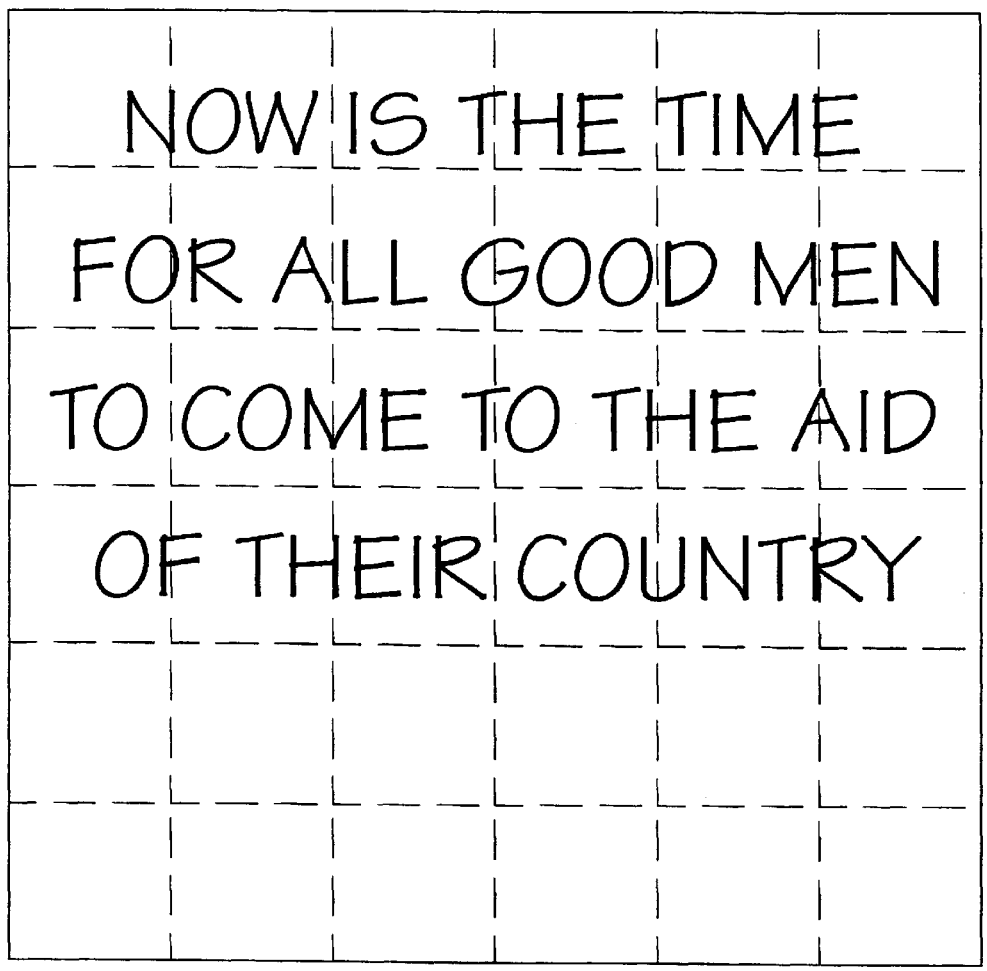
FIG. 3A is a diagram illustrating a text image as may be encoded by the present invention.

For ease of reference, it might be pointed out that reference numerals in all of the accompanying drawings typically are in the form "drawing number" followed by two digits, xx; for example, reference numerals on FIG. 1 may be numbered 1xx; on FIG. 3, reference numerals may be numbered 3xx. In certain cases, a reference numeral may be introduced on one drawing and the same reference numeral may be utilized on other drawings to refer to the same item.

DETAILED DESCRIPTION OF THE EMBODIMENTS

What is described herein is a method and apparatus compressing information as may be utilized by the present invention.

As has been discussed in the background section, numerous methods of compressing information are known in the art. Depending on the particular method chosen, it may have advantages or disadvantages over other available methods with respect to the content of information in a particular data file. The present invention discloses a computer implemented method which advantageously analyzes the content of information in a data file and selects a compression method based on the content of the data file. The data file is then compressed with the selected compression method.

JPEG and GIF are exemplary compression methods. It has been discovered that JPEG is particularly well suited for data files having a large number of colors, but is a relatively poor compression method for compressing textual information when compared with GIF. Similarly, GIF is a relatively good compression method for textual files, but is relatively poor for compression of data files having a large number of colors.

A basic method, as may be utilized by the present invention, for selection of a compression method is illustrated by FIG. 1. In FIG. 1, initially, the content of information in a data file is analyzed, block 101. In the described embodiment, the information is analyzed to determine the number of colors (sometimes referred to as color groups). In the described embodiment, the content is analyzed for a total number of colors and, in addition, as will be described, the number of black pixels and the number of white pixels are tracked.

In alternative embodiments, the date file may be analyzed for other information. For example, in data files containing motion pictures, the content of the data file may be examined to determine the frame by frame differences (e.g., the number of pixels changing from frame to frame) in order to determine a compression method. In a data file containing audio information, the data file may be compressed as 8 or 16 bit audio dependent on, for example, an analysis of the frequencies of sound present in the data file.

In the described embodiment, if the number of colors is greater than 256, block 102, a process is implemented to discard "stray" pixels, block 103. This process will be described in greater detail with reference to FIG. 2. The process of discarding stray pixels may reduce the total color count below 256.

Finally, a compression method is chosen based on the content of information in the data file, block 104. In the described embodiment, if the number of colors (after discarding "stray" pixels) is greater than 256, JPEG is selected as the compression method. If the number of pixels is less than or equal to 256, GIF is chosen as the compression method.

Following, selection of a compression method, the data file is compressed, block 105.

Discarding Pixels

Figure 2:
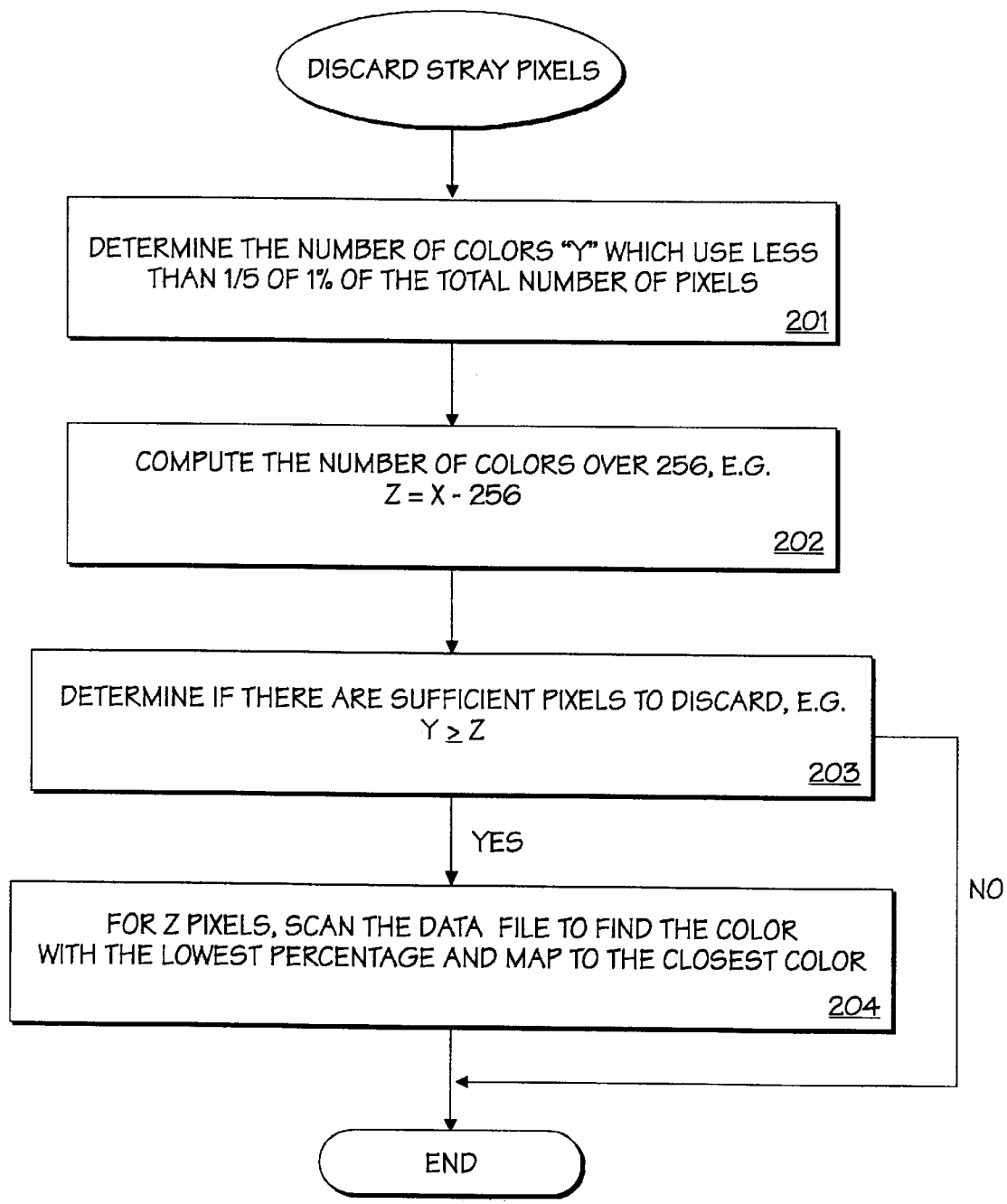
FIG. 2 is a flow diagram illustrating a method of discarding stray pixels as may be utilized by the present invention.

Turning now to FIG. 2, a method of discarding stray pixels is described. It is generally desirable to use GIF where possible as a compression method. Therefore, if the number of colors is initially determined to be greater than 256, in the described embodiment, an attempt is made to "discard" some colors (and substitute nearby colors) so that the total number of colors is less than or equal to 256.

Initially, the number of colors "Y" which are used relatively infrequently is determined, block 201. In the described embodiment, a color is considered to be used infrequently if it is used for less than ⅕ of 1% of the total pixels in the data file. Of course, in alternate embodiments, some other threshold may be chosen.

Next, a determination is made whether there are sufficient colors to discard, e.g., if there are enough discardable colors to reduce the total pixel count below 256. The total number of colors required to be discarded "Z" is computed simply as X−256 (where X is the total number of colors), block 202. If Y is greater than or equal to Z, there are sufficient colors to discard, block 203. Otherwise, no pixels are discarded and, as discussed in connection with FIG. 1, JPEG is chosen as the compression method.

Assuming there are sufficient colors to discard, Z colors are discarded by iteratively scanning the data file to determine the color with the lowest percentage of pixels, block 204. This color is then discarded and all of its pixels are mapped to another color in color space. Preferably, the color is one of the closest colors in color space so that the appearance of the information when displayed is only marginally affected.

In one embodiment of the invention, a test is done to determine if a number of close by colors have been previously discarded. If there have been a number of close by colors discarded, the color may not be a candidate to be discarded even though it occupies the least percentage of colors in the data file.

Determine if Information is Text

As has been discussed, generally GIF is well-suited for compression of textual bit-mapped files. However, some documents may include a large number of colors, but consist mainly of text. For example, a colorful border may surround a text. In this case, it may be desirable to recognize the document as a text document. Therefore, the present invention discloses a method of categorizing a document as a text document irregardless of the number of colors in the document and choosing GIF as the compression method.

Figure 3B:
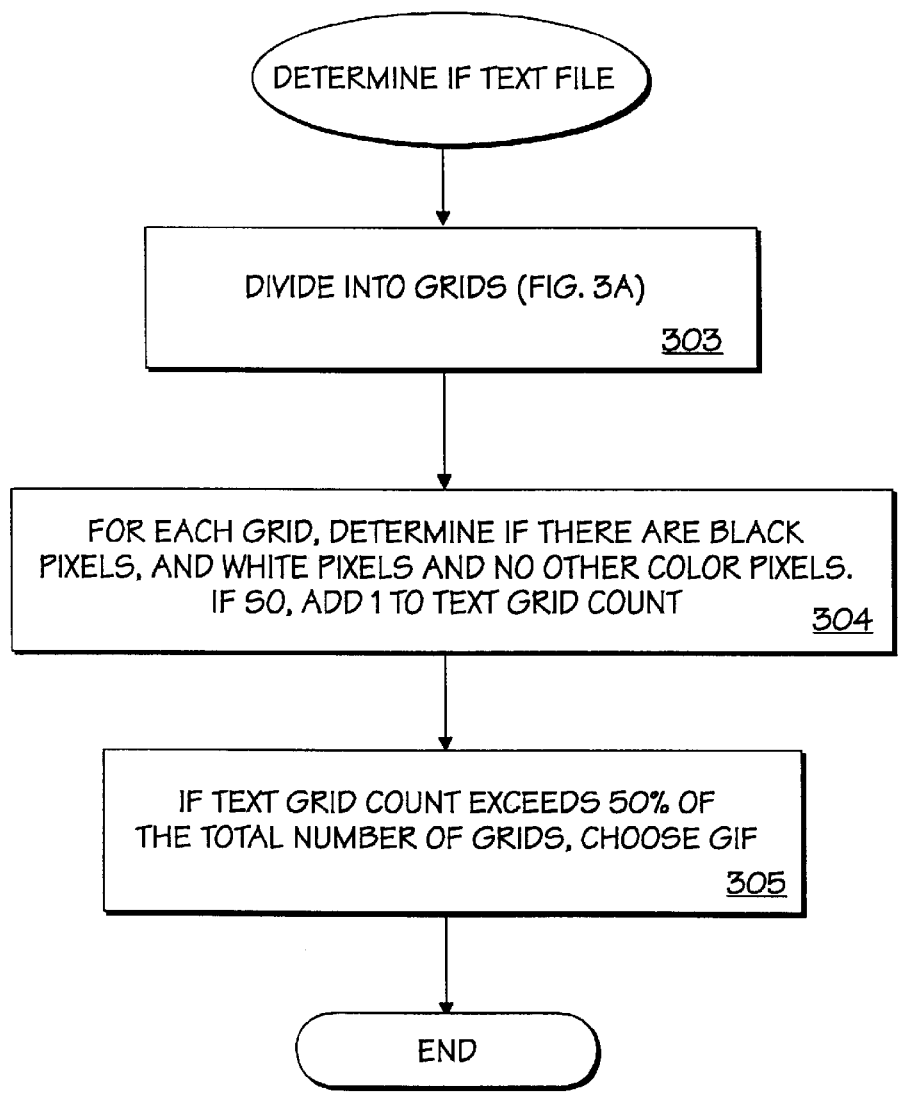
FIG. 3B is a flow diagram illustrating a method of identifying text images as may be utilized by the present invention.

Turning to FIG. 3B, the image is divided by a grid 303. An example is given in FIG. 3A as image 301. It has been determined that it is advantageous to have the grid divide the image into non-square rectangles, and in particular rectangles with the width longer than the height. This allows for better classification of a the image as textual. In general, grid size is chosen with a height high enough to include all of a 12 point character within a single grid.

For each grid or rectangle, a determination is made whether the grid contains both black and white pixels, but not other colors, block 304. If so, a count of the number of "text grids" ("text grid count" or TGC) is incremented by one. In some embodiments, gray pixels may be counted as black. Further, in some embodiments, if the grid contains all white pixels, it may be counted.

Next, a determination is made whether the text grid count exceeds some threshold percentage of the total number of grids. In one embodiment, the threshold is set at fifty percent. In alternative embodiments, the threshold may be lower or higher. If the text grid count exceeds the threshold, GIF is chosen as the compression method.

Indexing System

Figure 4:
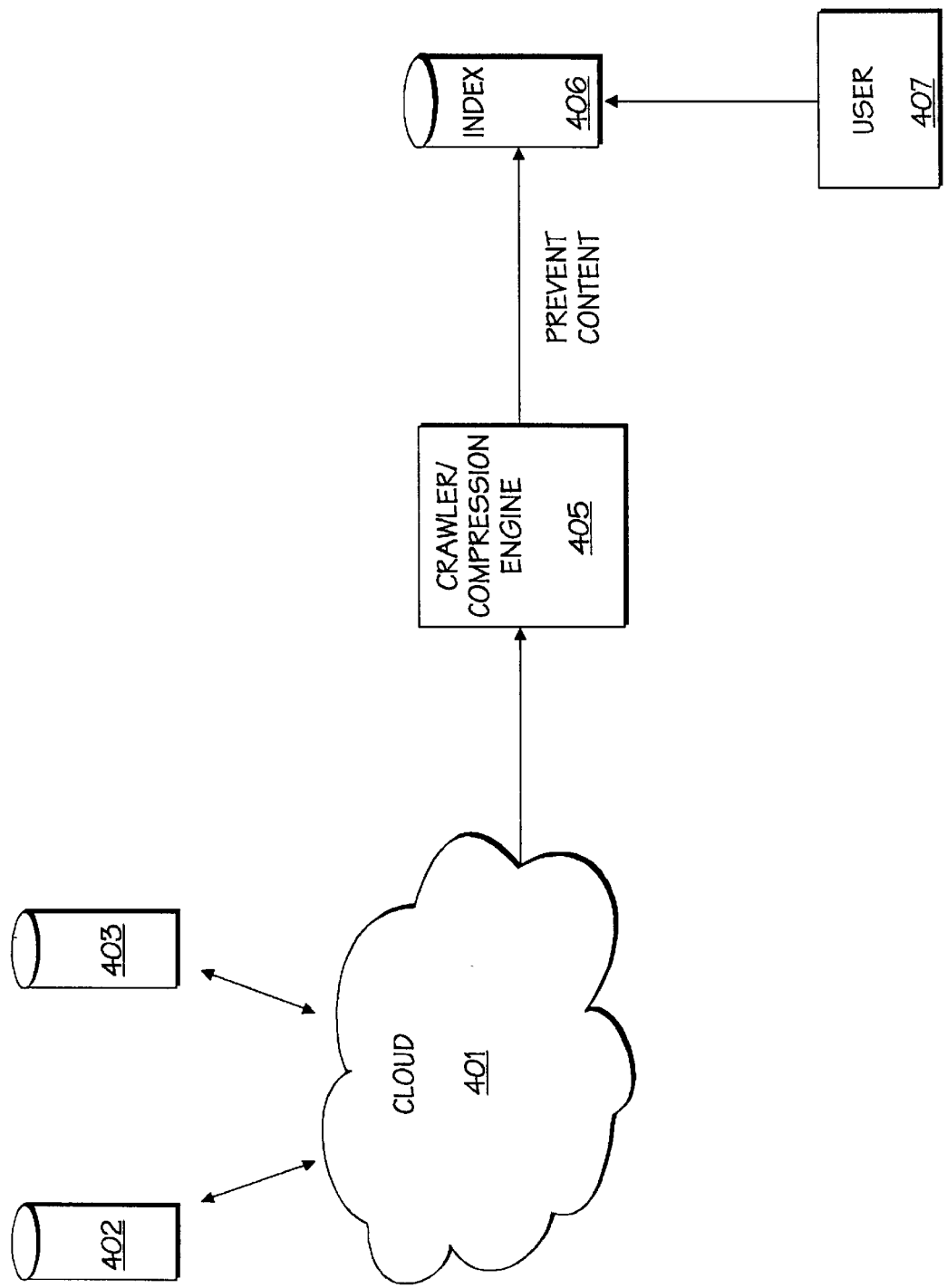
FIG. 4 is an illustration of an indexing system as may implement the present invention.

FIG. 4 illustrates an indexing system as may implement the present invention. One objective of the described indexing system is to produce the minimum file size for compressed image previews concurrent with producing maximum picture quality across a broad range of input data files.

As can be seen from FIG. 4, a crawler/compression engine 405 crawls a distributed network such as is illustrated by cloud 401 and servers 402 and 403. An example of a distributed network is the internet. However, the system has equal application to any number of networks, including both wide and local area networks and, in fact, has application in an single computer environment containing data to be indexed.

After discovering data to be indexed, the crawler/compression engine 405 compresses data as has been described herein and produces "preview content" which is stored in index 406. A user 407 may then access the index. 406.

Of course, alternatives to the described embodiments will be apparent to one skilled in the art. For example, it may be efficient in certain implementations to track whether a block is a text block at the same time as the image is being analyzed to determine the total number of colors.

What is claimed is:

1. A method of selecting a compression algorithm for compressing information comprising:
   a computer implemented process analyzing the characteristics of the information content in a data file by determining whether a number of colors in the information exceeds a threshold;
   if the number of colors exceeds the threshold, discarding sufficient colors to at least meet the threshold by determining the number of colors Y that are among a lesser used set of colors individually representing less than a predetermined percentage of the total number of pixels in the information, computing the number of colors Z in excess of a predetermined number, determining if there are a sufficient number of colors to discard in the lesser used set of colors by determining if Y is greater than or equal to Z, and if so, replacing one or more of the colors in the lesser used set of colors by mapping the one or more colors to one or more neighboring colors present in the information; and the computer implemented process selecting a compression method based on the characteristics of the information content in the data file.

2. The method as recited by claim 1 further comprising compressing the data file with the selected compression method.

3. The method as recited by claim 1 wherein the data file comprises a still image and the compression method is chosen from one compatible with JPEG or GIF.

4. The computer implemented method as recited by claim 1 further comprising discarding stray pixels prior to completion of determination of the number of colors.

5. A method of selecting a compression method for a set of binary information, the method comprising:

analyzing the number of colors represented in the set of binary information by performing an initial analysis of the content to determine the number of colors;

if the number of colors exceeds a threshold, attempting to discard sufficient colors to at least meet the threshold by determining the number of colors Y which use less than a predetermined percentage of the total number of pixels in the information, computing the number of colors groups Z in excess of a predetermined number;

determining if there are sufficient pixels to discard by determining if Y is greater than or equal to Z, and, if so, for Z colors, scanning the information to find the color with the lowest percentage and mapping that color to the closest neighbor; and determining if the number of color remaining in the content exceeds the threshold; and if so, choosing a first compression method and if not, choosing a second compression method.

6. The method as recited by claim 5 further comprising compressing the data file with the selected compression method.

7. The method as recited by claim 5 wherein the data file comprises a still image and the first compression method is compatible with the JPEG standard and the second compression method is compatible with the GIF standard.

8. The method as recited by claim 5 further comprising discarding stray pixels prior to completion of determination of the number of colors.

* * * * *